July 17, 1962  F. M. KASTEN ET AL  3,044,178
THREAD TAPER GAGE
Filed Nov. 13, 1959
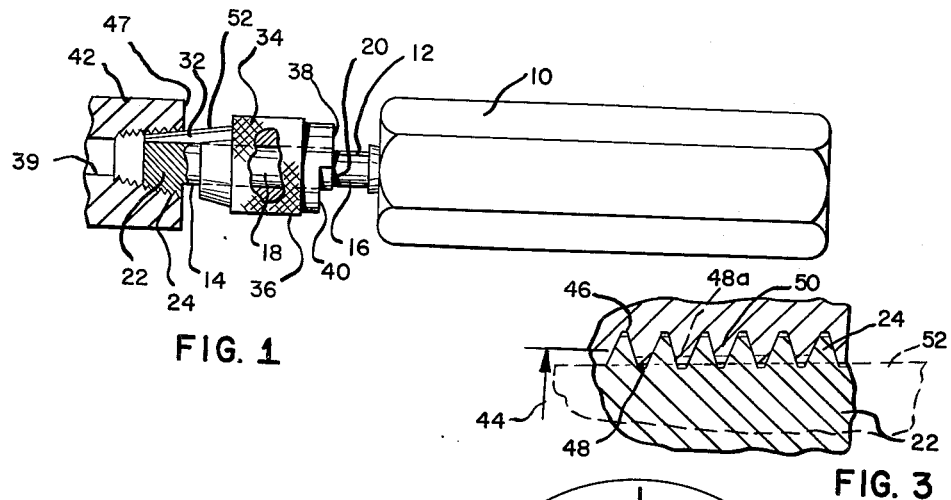
FIG. 1
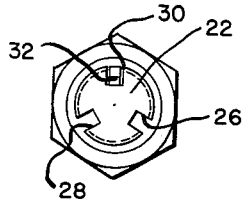
FIG. 2
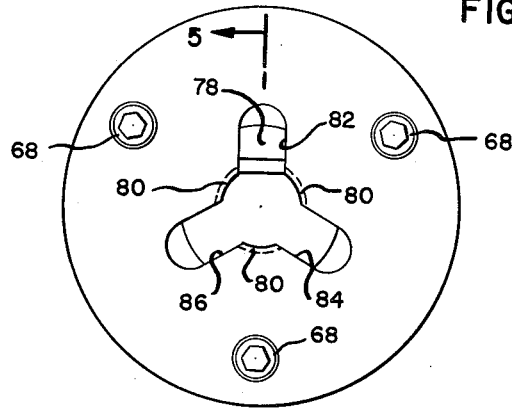
FIG. 3
FIG. 4
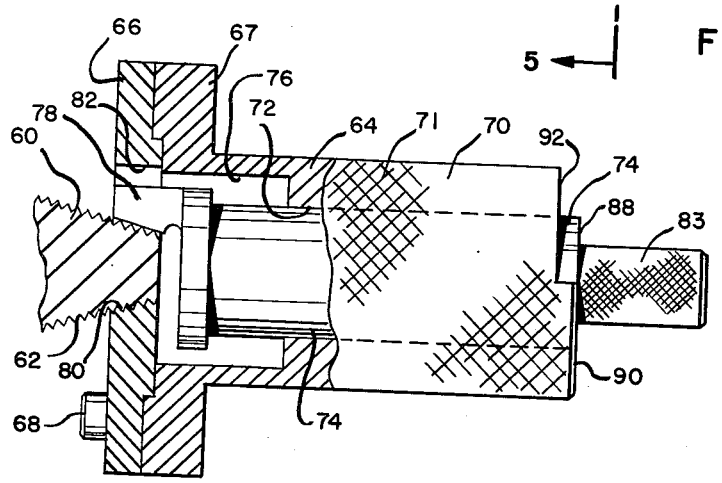
FIG. 5
*INVENTORS*
FREDERICK M. KASTEN
ROBERT KASTEN
RUSSELL S. COOKE
BY
WILSON, LEWIS & McRAE
ATTORNEYS 3,044,178
THREAD TAPER GAGE
Frederick M. Kasten, Pontiac, Russell S. Cooke, Birmingham, and Robert Kasten, Detroit, Mich., assignors to Alameda Gage Company, Royal Oak, Mich., a corporation of Michigan
Filed Nov. 13, 1959, Ser. No. 852,678
8 Claims. (Cl. 33—199)

This invention relates to gages, and particularly to gages for measuring the relationship between the pitch diameter and the major or minor diameter of tapered threads.

Tapered thread connections are commonly employed in fluid systems for effecting tightly sealed joints without need for gummy sealants or gasket arrangements. In order for the tapered threads to be effective the thread pitch diameters (or thread truncation) should be closely controlled; otherwise the meshing thread surfaces will not have the desired tight fit at locations along the threaded joint.

Various devices have been developed for testing the pitch diameters of tapered threads. For example, in U.S. Patent 2,339,699 issued to Linton A. Husband on November 10, 1942, there is disclosed a gage for tapered threads, said gage comprising a stem portion connected with a threaded head portion, and said stem portion slidably received a truncation gage element. In use of the gage the threaded head portion is threaded into an internally threaded work piece and the truncation gage is then slid axially along the stem portion to abut against the crest portions of the work piece threads. The axial displacement of the truncation gage element along the stem portion serves as a measure of the relationship of the pitch diameter of the threads to the minor diameter thereof. Suitable steps are formed on the cooperating portions of the gage to visually indicate the truncation gage displacement.

The tool disclosed in the Husband patent is suitable for measuring the pitch diameter-minor diameter relationship at a single point on the work piece thread circumference. However, the patented tool makes no allowance for out-of-roundness of the threads or eccentricity of the threads with respect to the work piece opening axis. Thus, in utilizing the patented tool, if the work piece threads are off center with respect to the axis of the work piece opening then the depth of the work piece threads (as measured at one point only on the thread circumference) may incorrectly denote an acceptable thread depth, whereas the thread may be excessively deep or excessively shallow at other points around the thread circumference. For this reason the patented tool is not fully acceptable, particularly in situations where the work piece threads are out-of-round or off center with respect to the hole axis.

The same considerations as discussed above also apply in the gaging of externally threaded work, except of course for the fact that the gage is used to measure the major diameter-pitch diameter relationship rather than the minor diameter-pitch diameter relationship.

With the above discussion in mind, it is a principal object of the present invention to provide a measuring tool for measuring the relationship between the pitch diameter and/or minor diameter of tapered threads at a plurality of separate points around the thread circumference so as to indicate thread eccentricity or out-of-roundness.

An additional object is to provide a gage of the above-mentioned type wherein a minimum of machining is required in the gage manufacturing operation.

A further object is to provide a gage of the above-mentioned type wherein a minimum quantity of expensive material is utilized.

An additional object is to provide a gage of the above-mentioned type wherein the gage construction is relatively compact and of small dimension.

An additional object is to provide a gage of the above-mentioned type wherein a minimum number of parts are employed.

A still further object of the invention is to provide a gage of the above-mentioned type wherein an improved slidable mounting of the measuring element is achieved.

Other objects of this invention will appear in the following description and appended claims, reference being had to the accompanying drawings forming a part of this specification wherein like reference characters designate corresponding parts in the several views.

In the drawings:

FIGURE 1 is a front elevational view of one embodiment of the invention with parts thereof broken away for illustration purposes. The FIG. 1 embodiment is shown threaded into a suitable work piece having tapered threads to be measured by the tool.

FIG. 2 is a left end elevational view of the FIG. 1 tool.

FIG. 3 is an enlarged view showing the meshing threads of the FIG. 1 work piece and measuring tool.

FIG. 4 is a left end elevational view of the tool shown in FIG. 5.

FIG. 5 is a front elevational view of the tool shown in FIG. 4, with parts thereof sectioned on line 5—5.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to the drawings and particularly to FIGS. 1 and 2, there is shown a measuring tool comprising a manually-grippable handle portion 10 suitably bored to fixedly receive the stem portion 12 of a work-gripping element 14. Stem portion 12 includes a relatively small diameter stem section 16 and a relatively large diameter stem section 18, said sections cooperating together to define a shoulder or step 20.

Integrally formed with stem section 18 is a head portion 22 formed with the tapering threads 24 therein. As will be noted from FIG. 2 the head portion 22 is provided with three axially extending slots 26, 28 and 30. Slot 30 is not visible in FIG. 1 since the arm portion 32 of the measuring element 34 is extended therethrough in the FIG. 1 position. Measuring element 34 comprises a manually-grippable collar portion 36, preferably knurled on its outer surface, and having a rotary and slidable fit on the stem portion 18. The right end surface 38 of collar portion 36 is recessed to provide the axially indented surface or step 40, the arrangement being such that when the handle portion has been turned to thread the head portion 22 into the work piece 42 and the collar 36 has been slid to the left to the limit of its movement, an acceptable pitch diameter-minor diameter relationship is established if the step 20 is anywhere between the step surfaces 38 and 40. If the step 38 is located to the left of step 20 the minor diameter at the measured point on the work piece threads is too large in relation to the pitch diameter. Conversely if the step 40 is located to the right of step 20 then the minor diameter at the measured point is too small in relation to the pitch diameter.

Referring to FIG. 3, the pitch diameter as used herein refers to the diameter indicated generally by the dimension 44, i.e., the diameter initiating from a point intermediate the root portion 46 and the crest portion 48 of the work piece threads 50. Since the tapered work piece threads are intended to have a tight fit on the external threads of the cooperating work piece (not shown), the pitch diameter and major and minor diameters should desirably fall within certain limits. Thus, the crest portions 48 of the work piece should not be unduly shortened or truncated at any point around the thread circumference, and likewise the root portions 46 should not be unduly truncated or narrowed at any point around the thread circumference. Otherwise the work piece threads 50 will not have a desired fit on the cooperating threaded element (not shown).

In order to indicate the extent of work piece thread truncation, the FIG. 1 tool is provided with the arm 32 having a tapering surface 52 for contacting the crest portions of the work piece threads. In operation of the FIG. 1 tool, handle 10 is turned until the right face of thread gage head portion 22 is substantially flush with the work piece face 47. Gage portion 22 may be constructed similarly to the conventional threaded plug gage, in which case the threaded portion is correctly seated relative to the work if its right face is no more than one turn into the work or one turn out of the work.

After element 10 has been turned sufficiently to correctly position the work-gripping portion 22, the collar 36 is manually rotated until the arm 32 is aligned with one of the slots 26, 28 or 30. The measuring element 34 is then slid axially on stem portion 18 to the leftward limit of its motion. The leftward movement of arm 32 is limited by engagement with the work piece thread crest portions 48. If these crest portions are not unduly truncated (or shortened) as shown in FIG. 3 measuring element 34 will be stopped in a position wherein its steps 38 and 40 are located on opposite sides of the step 20. However, if the work piece thread crest portions 48 are excessively truncated (as indicated by the dotted line 48a in FIG. 3) the measuring element 34 will be moved further to the left so that step 38 will pass to the left of step 20 and thereby furnish an indication of the excessive thread crest truncation (i.e., an unacceptably large pitch diameter 44 in relation to the minor diameter). If the thread crest portions 48 are insufficiently truncated the measuring element 34 will be stopped with the step 40 thereof located to the right of step 20 so as to indicate an unacceptable thread truncation (i.e., an unacceptably small pitch diameter in relation to the minor diameter).

It will be noted that the portion of arm 32 which is inserted into the slots 26, 28, 30 is shorter than the permissible axial travel of the collar portion 36 on the stem section 18 so that measuring element 34 may be withdrawn to the right and rotated around the axis of stem portion 18 to place arm 32 in alignment with any one of the three slots 26, 28, 30. By successively moving the measuring element through the different slots 26, 28 and 30 it is possible to measure the thread truncation (pitch diameter-minor diameter relation) at spaced points around the work piece thread circumference. In some cases the work piece threads may be out-of-round or eccentric with respect to the axis of hole 39. Thus, a measurement using slot 30 may indicate an acceptable thread truncation whereas the measurements with slots 26 and 28 may indicate an excessive thread truncation. The three measurements taken together indicate out-of-roundness or an eccentricity of the threads with respect to the hole axis. Without the rotatable mounting of measuring element 34 it would be impossible to detect this out-of-roundness or eccentricity, since measurement at one point only on the thread circumference is insufficient to detect the condition.

It will be noted from FIG. 1 that measuring element 34 is relatively small in the axial dimension, thereby conserving on expensive materials and machining operations. Also, the operative components of the gage comprise only two relatively movable members, i.e., the work-gripping element 12 and the measuring element 34. This is a material simplification over prior art arrangements for the detection of out-of-roundness or eccentricity.

Referring to FIGS. 4 and 5, there is provided a gage similar in general principle to the gage shown in FIG. 1. However, the FIG. 4 gage is intended to operate on externally threaded work pieces rather than internally threaded work pieces as in the FIG. 1 arrangement. In the FIG. 4 embodiment the work-gripping element comprises a two part assembly defined by members 64 and 66. Member 64 is provided with a peripheral flange 67 which permits the two members to be rigidly locked together by means of the machine screws 68. Member 64 comprises an externally knurled sleeve or collar portion 70 defining a bore 72 for rotary and slidable reception of the measuring element stem portion 74. Sleeve portion 70 is recessed or counter-bored at 76 to accommodate the arm 78 of the measuring element in its retracted position.

Member 66 takes the form of a substantially flat annular plate having its inner peripheral surface threaded, as at 80. Three circumferentially spaced slots are provided at 82, 84 and 86 for selective reception of the measuring element arm 78.

It will be seen that in operation of the FIG. 4 tool, after the knurled surface 71 of member 64 has been grasped to thread the work gripping element into a predetermined position on the work piece threads 62, the knurled end portion 83 of the measuring element stem 74 may be grasped to rotate stem portion 74 in bore 72 so as to align the measuring arm 78 with a selected one of the slots 82, 84 or 86. An axial force may then be applied to knurled portion 83 so as to move the measuring element 78 into abutment with the work piece threads for measuring the relationship between the pitch diameter and major diameter. If the pitch diameter-major diameter relationship is within acceptable limits, the step 88 formed between stem 74 and extension 83 will lie between the steps 90 and 92 formed on member 64. If the pitch diameter-major diameter relation is unacceptably too small step 88 will lie to the right of step 90, and if the pitch diameter-major diameter relation is unacceptably too large the step 88 will lie to the left of step 92.

As with the FIG. 1 embodiment, the FIG. 4 embodiment is adapted to detect out-of-roundness and thread eccentricity (by the use of the three circumferentially spaced slots 82, 84 and 86). It will be further noted that the FIG. 4 tool is constructed as a relatively compact small size item, whereby to economize on materials and machining operations.

Both forms of the invention are susceptible to quick, convenient use, whereby to enable speedy accurate inspection of different work pieces.

It will be appreciated that various modifications of the structures shown herein could be made without departing from the spirit of the invention as defined in the appended claims.

We claim:
1. A gage tool for tapered threads comprising a work-gripping element having a threaded portion adapted to mesh with the work threads; and a measuring element slidably and rotatably carried on the work-gripping element and having a portion thereof adapted to contact the work thread crest portions at a series of circumferentially spaced points by successively sliding the measuring element on the work-gripping element away from the work threads, rotating the measuring element to a new angular position on the work-gripping element, and sliding the measuring element toward the work threads.

2. The combination of claim 1 wherein the work-gripping element includes a stem, and the measuring element comprises a collar slidably and rotatably mounted on said stem.

3. The combination of claim 1 wherein the work-gripping element comprises an internally threaded member, and the measuring element comprises a stem slidably and rotatably mounted in said member.

4. A tool for measuring the thread crest diameter-pitch diameter relation of tapered threads comprising a work-gripping element having a threaded portion adapted to mesh with the work threads; and a measuring element slidably and rotatably carried on said work-gripping element and having a work-engaging portion adapted to abut against the work thread crest portions; one of said elements comprising a collar portion, and the other element comprising a stem portion having a rotary fit within the collar portion; said work-gripping element having a plurality of axially extending slots formed therein, and said measuring element having its work-engaging portion extendable selectively through the different slots to measure the thread crest diameter-pitch diameter relation at spaced points around the work threads.

5. The combination of claim 4 wherein the work-gripping element includes a stem portion and the measuring element comprises a collar portion rotatably encircling the stem portion.

6. The combination of claim 4 wherein the work-gripping element comprises a collar portion, and the measuring element comprises a stem portion having a rotary fit within the collar portion.

7. A tool for measuring the eccentricity of tapered internal threads, comprising a work-gripper element having a relatively long handle portion, a relatively short stem portion connected with said handle portion, and a relatively short threaded head portion connected with the stem portion, said head portion having at least three axially-extending slots formed in its periphery; a measuring element comprising a collar portion axially slidable and rotatably fitted onto said stem portion, and a tapering arm extending from said collar portion for entry through selected ones of the slots into abutment with the work thread crests to measure thread eccentricity; the portion of said arm entered through the slots being shorter than the permissible length of axial travel of the collar portion on the stem portion so that the measuring element can be operated to position the arm in axial alignment with different ones of the slots.

8. A tool for measuring the eccentricity of external tapered threads comprising a work-gripping element formed as a two part assembly, one of said parts including an annular plate having work-engaging threads formed on its inner periphery and axially extending slots formed in its inner periphery at spaced points therearound, the other part comprising a sleeve portion having a recess and a flange portion surrounding the recess, the two parts being secured together with the flange portion abutting again the plate; and a measuring element including a stem portion slidably and rotatably fitting within the aforementioned sleeve portion, and an arm projecting from said stem portion within the recess for selective entry through any of the aforementioned slots, said arm having a tapering surface adapted to abut against the work thread crest portions when it is located within any of the slots to thereby measure the major diameter-pitch diameter relation at spaced points around the work thread circumference.

References Cited in the file of this patent

UNITED STATES PATENTS

| | | |
|---|---|---|
| 2,339,699 | Husband | Jan. 18, 1944 |
| 2,387,814 | Straw | Oct. 30, 1945 |
| 2,487,677 | Steczynski | Nov. 8, 1949 |
| 2,556,564 | Troedson | June 12, 1951 |